United States Patent [19]

Brauning

[11] 4,003,067
[45] Jan. 11, 1977

[54] AUTOMATIC PHOTOGRAPHIC SHUTTER CONTROL APPARATUS

[75] Inventor: Gerhard Brauning, Stuttgart, Germany

[73] Assignee: Eastman Kodak Company, Rochester, N.Y.

[22] Filed: June 3, 1975

[21] Appl. No.: 583,495

[30] Foreign Application Priority Data

June 6, 1974 Germany .......................... 2427365

[52] U.S. Cl. .............................. 354/235; 354/261; 354/265
[51] Int. Cl.² .......................................... G03B 9/08
[58] Field of Search .......... 354/234, 235, 245, 246, 354/247, 248, 249, 261, 265, 266

[56] References Cited

UNITED STATES PATENTS 3,492,931  2/1970  Racki .................. 354/234
3,784,291  1/1974  Hirata .................. 354/235

*Primary Examiner*—Monroe H. Hayes
*Attorney, Agent, or Firm*—J. L. Palmer

[57] ABSTRACT

Camera exposure control apparatus utilizing an electronic timing circuit connected to an electromagnet for controlling, through a drive member, the movement of a shutter which opens and closes to establish an exposure interval. A latch, actuated by movement of the drive member to open the shutter, opens a switch to de-energize the electromagnet and moves into position to hold the drive member to prevent its movement to close the shutter during the time interval that the electromagnet is de-energized. Following a subsequent energization of the electromagnet the latch is released and the drive member moves to close the shutter.

7 Claims, 8 Drawing Figures

AUTOMATIC PHOTOGRAPHIC SHUTTER CONTROL APPARATUS

BACKGROUND OF THE INVENTION

1. Field of the Invention

This invention relates to cameras. More specifically, this invention relates to cameras employing what is commonly known as an electronic shutter.

2. Description of the Prior Art

The term "electronic shutter" has been applied to exposure control systems for cameras in which an electronic timing circuit responsive to scene light is actuated synchronously with the opening of the camera shutter. The timing circuit triggers closing of the shutter after a time has elapsed which is functionally related to scene light conditions. This mechanism has the advantage of high accuracy for both low and high conditions of scene illumination. An example of such an exposure control system appears in Harvey, "Photographic Apparatus," U.S. Pat. No. 3,680,453.

It is known to energize an electromotive source or solenoid to start an exposure interval and to re-energize the same source to terminate the exposure interval. See, for example, Bowers, "Electrically Actuated Camera Shutter," U.S. Pat. No. 1,444,365.

It is also known to energize an electromagnet to start an exposure interval after a predetermined time delay. An electronic timing circuit re-energizes the electromagnet to terminate the exposure interval. See Minoru Suzuki et al, "Automatic Light Responsive Shutter Timing Mechanism," U.S. Pat. No. 3,349,678

In Bestenreimer, "Photographic Camera," U.S. Pat. No. 3,385,187, a camera is disclosed having an electromagnet controlled lever interacting with a shutter member to establish the size of an exposure aperture. Cocking of the shutter member energizes the electromagnet. De-energization of the electromagnet locks the shutter member and fixes the size of the exposure aperture. Re-energization of the electromagnet releases another member to terminate the exposure interval.

SUMMARY OF THE INVENTION

According to the invention, an improved apparatus is provided for use in a camera having an exposure control system utilizing an electronic timing circuit operably connected to an electromagnetic member for controlling through drive means the movement of shutter means which opens and closes to establish an exposure interval. A latch, actuated by movement of the drive member to open the shutter to initiate an exposure interval, opens a switch to de-energize the electromagnet and holds the drive member to prevent its movement to close the shutter when the electromagnet becomes de-energized. Following a subsequent energization of the electromagnet, the latch is released and the drive member moves to close the shutter.

The invention and its features and advantages will be set forth and become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because exposure control systems are well known, the present description will be directed in particular to elements forming part of, or cooperating more directly with, the present invention, elements not specifically shown or described herein being understood to be selectable from those known in the art.

Figure 1:
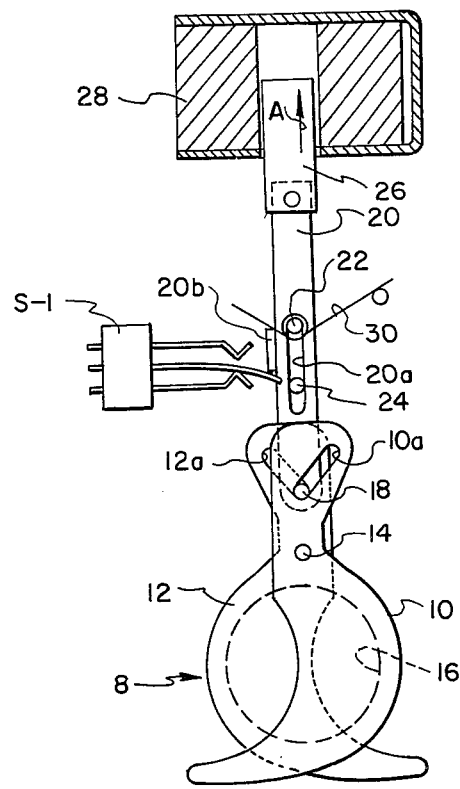
FIG. 1 is a view of prior art apparatus utilizing an electronic timing circuit for controlling the length of an exposure interval in a photographic camera.

Referring now to FIG. 1, the components of apparatus known to the prior art for controlling the length of an exposure interval in a photographic camera may be seen. In the closed position shown, a shutter 8, having shutter blades 10 and 12 rotatably mounted on a pin 14, blocks an exposure aperture 16 operatively associated with the camera lens system (not shown). The size of the aperture 16 may be varied (by means not shown) in response to the sensed level of ambient illumination. The upper ends of the blades 10 and 12 contain slots 10a and 12a, respectively, in which a pin 18, connected to a drive member 20, slides. The drive member 20 contains a slot 20a for slidably mounting the drive member 20 on fixed pins 22 and 24. Attached to or forming part of the top of the drive member 20 is a plunger-type armature 26 of an electromagnet 28. A return spring 30 mounted on the fixed pin 22 engages a protruding portion 20b on the drive member 20 to hold the blades 10 and 12 in the closed position shown.

When a shutter release member (not shown) is actuated, current is provided the electromagnet 28 through a switch S-1, which is part of a conventional electronic timing circuit (not shown). Energization of the electromagnet 28 causes a movement of the armature 26 in the direction of arrow A which raises drive member 20 causing the pivoting of blades 10 and 12 and the unblocking of the exposure aperture 16. As long as the electromagnet 28 is energized, the blades 10 and 12 will remain in an unblocking position. De-energization of the electromagnet 28 in response to a signal from the electronic timing circuit allows the spring 20 to move the blades 10 and 12 from the unblocking to the closed position. While the electromagnet 28 is holding the blades 10 and 12 in the unblocking position, there is a drain on a battery (not shown) supplying current to the electromagnet 28. With normal exposure times (1/30 sec. or less), the drain on the battery is acceptable; however, when long exposure times are anticipated, the drain on the battery becomes unacceptable.

Figure 2:
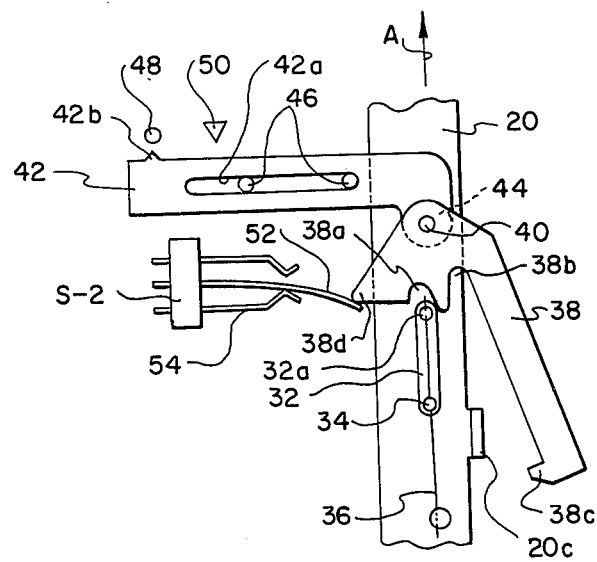
FIG. 2 is an exploded view of a portion of the apparatus of FIG. 1, modified in accordance with the present invention.

Referring to FIG. 2, an improvement of the apparatus of FIG. 1 is shown. The drive member 20 of FIG. 1 has been modified between the pin 22 and the armature 26. One end of a thrust pawl 32 is affixed by a pin 34 to a center portion of the drive member 20. The other end of the pawl 32, designated 32a, is rotatable about the pin 34. A spring member 36, affixed to the pin 34, tends to hold the pawl 32 in the vertical position shown in FIG. 2. A blocking lever 38 is hingedly attached by a pin 40 to a movable slider 42. A friction disk 44 is mounted between the lever 38 and the slider 42 to retard the movement of the lever 38. The slider 42 contains a slot 42a for slidably mounting the slider 42 on fixed pins 46 attached to a portion (not shown) of the camera. The pins 46 serve as guide and stop means for the transverse movement of the slider 42.

The slider 42 is movable (by means not shown) from an operative or first position, corresponding with index mark 48, to an inoperative or second position, corresponding with index mark 50. In the operative position indentations 38a and 38b in the lever 38 are engageable by the pawl 32 upon movement of the drive member 20. In the inoperative position the lever 38 is moved to a position where it will not be influenced by the pawl 32. The index marks 48 and 50, affixed to a portion of the camera (not shown), in conjunction with a protrusion 42b on the slider 42, indicate the position of the slider 42.

The aforementioned lever 38, in addition to the indentations 38a and 38b, has a blocking lug 38c designed to interact, in a manner to be described later, with a protrusion 20c on the drive member 20. The lever 38 also has an end 38d whose movement controls the opening and closing of a switch S-2 comprised of a contact spring 52 and a contact 54.

The use of the improved apparatus of FIG. 2 to control an exposure of extended duration will now be explained.

Figure 3:
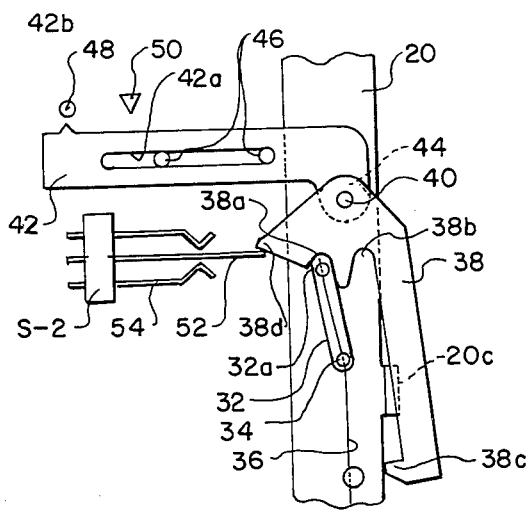
FIGS. 3–5 depict the position of the components of FIG. 2 during different stages of the exposure interval.
Figure 6A:
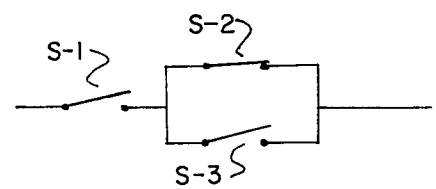
FIGS. 6 a–c are schematic representations of the position of control switches used in conjunction with the apparatus of FIG. 2.

When an operator determines that an exposure interval of extended duration is expected, he sets the slider 42 to the operative position. Preferably the camera will be affixed to a tripod or other stable platform to eliminate camera movement during the exposure interval. The operator then actuates the shutter release member to furnish current to the electromagnet 28 through the closed switches S-1 and S-2. FIG. 6a shows schematically the position of the switches prior to the actuation of the shutter release member. After energization of the electromagnet 28, drive member 20 moves in the direction of arrow A. Continued upward movement of the drive member 20 results in the end 32a of the pawl 32 entering the indentation 38a on the lever 38 causing clockwise rotation of the lever 38 as shown in FIG. 3. This rotation brings blocking lug 38c into contact with drive member 20 below the protrusion 20c and allows the end 38d to free the contact spring 52 from the contact 54. Freeing of the contact spring 52 opens the switch S-2. The position of the components of FIG. 2 when the Switch S-2 opens is shown in FIG. 3.

Figure 4:
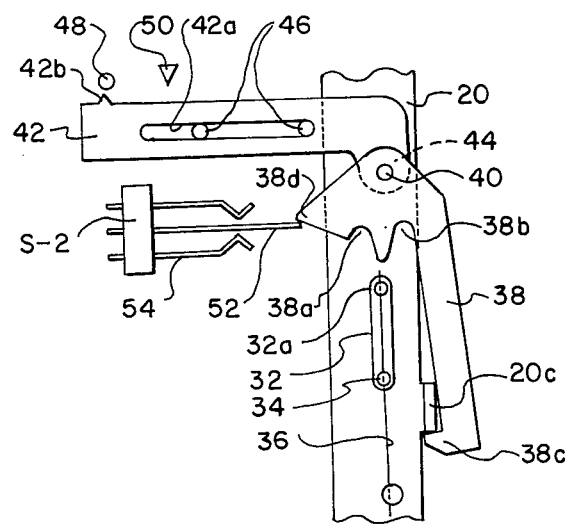
Figure 6B:
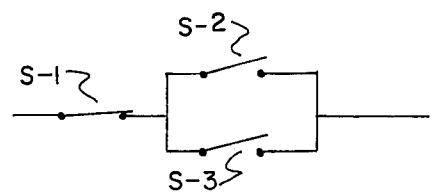

When switch S-2 is opened, the electromagnet 28 is de-energized and the drive member 20, under the influence of spring 30, starts to close the blades 10 and 12. Movement of the drive member 20 is stopped when the blocking lug 38c engages the protrusion 20c. Before the movement is stopped, pawl 32 is released from the indentation 38a and returns to its normal vertical position; however, because lever 38 has been rotated, indentation 38b is now located above end 32a. FIG. 4 shows the position of the components of FIG. 2 during the exposure interval. It will be understood, as shown in FIG. 6b, that during the exposure interval, switch S-1 is closed, switch S-2 is open, and the electromagnet 28 is de-energized.

Figure 5:
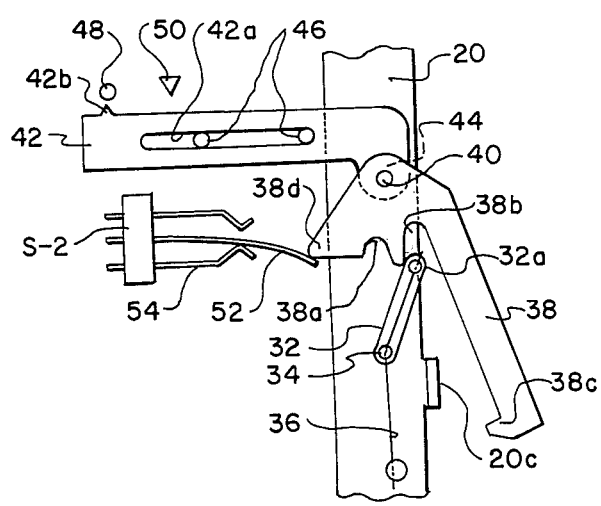
Figure 6C:
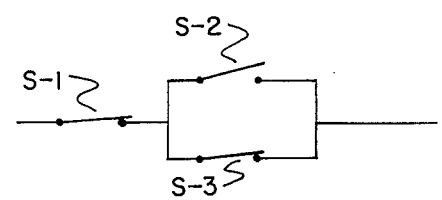

The electronic timing circuit, after a period of time functionally related to scene light conditions closes a switch S-3, as shown in FIG. 6c, thus bypassing switch S-2 and re-energizing the electromagnet 28 causing upward movement of the drive member 20. As the drive member 20 moves upward, end 32a of the pawl 32 enters the indentation 38b on the lever 38 causing the lever 38 to rotate counterclockwise. As shown in FIG. 5, this counterclockwise rotation frees the blocking lug 38c from the protrusion 20c and allows end 38d to close the switch S-2. Simultaneously the electronic timing circuit opens switch S-1 de-energizing the electromagnet 28. When the electromagnet 28 is de-energized, spring 30 causes movement of the drive member 20 to close the blades 10 and 12 and terminate the exposure interval.

When an operator anticipates an exposure interval of normal duration, he moves the slider 42 to the inoperative position. The switch S-2 will then have no effect on the energization of the electromagnet 28 which will, therefore, remain energized during the exposure interval.

Numerous means can be provided for controlling the movement of slider 42. For instance, movement can be controlled by scene brightness. When low light is sensed, an electromagnet is energized to move the slider 42 to an operative position. Alternatively, movement of the slider 42 to an operative position can occur as a result of a signal generated when the camera is affixed to a tripod. Still another alternative is to move the slider 42 to an operative position each time the camera is reset by the cocking gears. Means responsive to scene brightness would either retain the slider 42 in an operative position or move it to an inoperative position.

The invention has been described in detail with particular reference to the preferred embodiment thereof, but it will be understood that variations and modifications can be effected within the spirit and scope of the invention.

I claim:

1. In a camera having exposure control apparatus utilizing an electronic timing circuit operably connected to an electromagnet to control drive means to move a shutter to initiate and terminate an exposure, the drive means being moved in a first direction by energization of the electromagnet to move the shutter to initiate an exposure and being moved by spring means to move the shutter to terminate the exposure upon de-energization of the electromagnet, the improvement comprising:

movable means, actuated by the drive means upon initial movement thereof to initiate an exposure interval, for de-energizing the electromagnet during a portion of the exposure interval and for holding the drive means to prevent movement of the shutter to terminate the exposure interval; and means for momentarily re-energizing the electromagnet to move the drive means a second time in the first direction to release said movable means.

2. Apparatus according to claim 1 wherein said movable means includes:

a slide movable from an active position to an inactive position, said active position placing said movable means in a position to cause the de-energization of the electromagnet upon movement of the drive means;

switch means, operatively associated with said movable means, for de-energizing the electromagnet; and a lever attached to said slide and being rotatable in a first direction to open said switch means to de-energize the electromagnet and to engage a portion of the drive means to prevent movement thereof, said lever being rotatable in a second direction to release the drive means upon said second movement of the drive means.

3. In a camera having an exposure control system comprising an exposure aperture, movable shutter means for controlling the passage of light through said exposure aperture and an electronic circuit including an electromagnet energizable and de-energizable thereby to control the movement of said shutter means to initiate and terminate an exposure interval, the improvement comprising:
   drive means, connected to said shutter means and being movable in a first direction upon energization of said electromagnet for opening said shutter means and being movable by spring means in a second direction for closing said shutter means;
   a movable element responsive to the movement of said drive means in said first direction for selectively de-energizing said electromagnet during a portion of the exposure interval and for releasably holding said drive means to prevent movement to close said shutter means; and
   means for momentarily re-energizing said electromagnet prior to the termination of the exposure interval, said re-energization causing movement of the drive means in said first direction whereby said movable element releases said drive means thereby causing movement of said drive means in said second direction to close said shutter means.

4. In a camera, exposure control apparatus including means defining an exposure aperture, shutter means movable for opening and closing said exposure aperture to initiate and terminate an exposure interval, an electromagnet, drive means operatively associated with said electromagnet and connected to said shutter means, said drive means being moved in a first direction by energization of the electromagnet thereby moving said shutter means to open said exposure aperture and being moved in a second direction upon said de-energization of said electromagnet thereby closing said exposure aperture and circuit means for intially energizing said electromagnet thereby moving said drive means and initiating the exposure interval and for subsequently energizing and again deenergizing said electromagnet to move said drive means to terminate the exposure interval, the improvement comprising:
   movable means having a single member movable in a first direction for de-energizing said electromagnet during a portion of the exposure interval and for holding said drive means to prevent movement thereof in said second direction, and movable in a second direction for releasing said drive means; and
   engagement means operatively associated with said drive means for moving said movable means in said first direction upon intial energization of the electromagnet, and for moving said movable means in said second direction upon subsequent energization of the electromagnet.

5. In an exposure control system as claimed in claim 4, the improvement wherein said movable means comprises:
   a slide movable from an inactive position to an active position in which said movable means becomes positioned to be moved by said engagement means.

6. In an exposure control system as claimed in claim 5 the improvement wherein said single member of said movable means comprises:
   a rotatable member attached to said slide means, said rotatable member having:
   a first portion engageable by said engagement means upon initial energization of the electromagnet for rotating said rotatable member in said first direction;
   second portion operatively associated with said circuit means for de-energizing the electromagnet upon rotation of said rotatable member in said first direction;
   a third portion engageable with said drive member upon rotation of said rotatable member in said first direction for holding said drive member; and
   a fourth portion engageable by said engagement means upon subsequent energization of the electromagnet for rotating said rotatable member in said second direction thereby releasing said third portion from engagement with said drive means.

7. In a camera having a shutter, electromagnetic drive means and circuit means for energizing said electromagnetic drive means to drive said shutter open against spring bias and to de-energize said electromagnetic drive means to cause said spring bias to close said shutter, the improvement comprising:
   first switch means, actuatable upon movement of said drive means to open said shutter, for de-energizing said drive means during a portion of said open condition of said shutter;
   a latch coupled with said drive means to latch said shutter open during said portion of said open condition;
   second switch means for momentarily re-energizing said drive means; and
   means responsive to movement of said drive means for releasing said latch to cause said spring bias to close said shutter.

* * * * *